No. 667,825. Patented Feb. 12, 1901.
J. MAJOR.
APPARATUS FOR DYEING, &c.
(Application filed Aug. 14, 1900.)
(No Model.) 2 Sheets—Sheet 1.
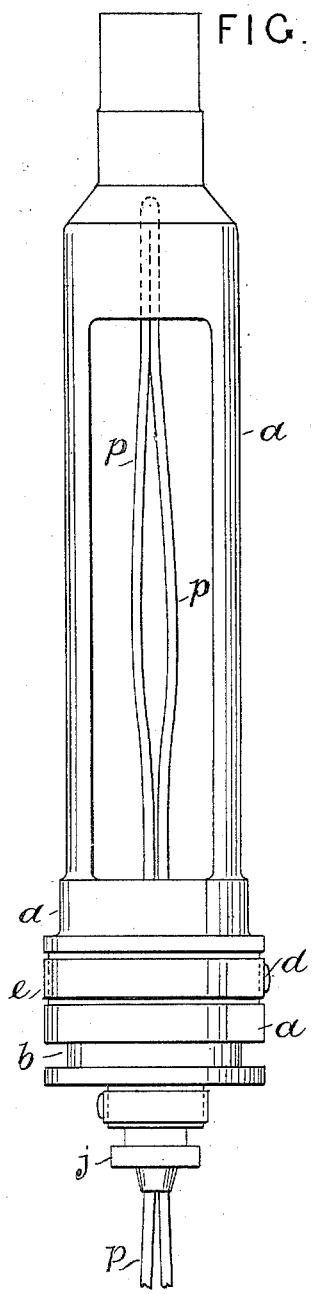
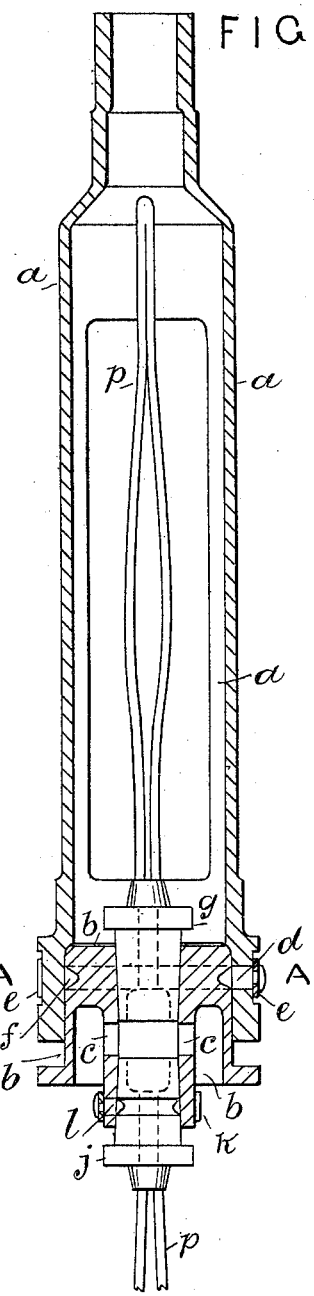
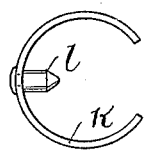
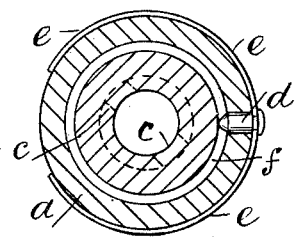
INVENTOR
JAMES MAJOR
BY
Howson and Howson
HIS ATTORNEYS.

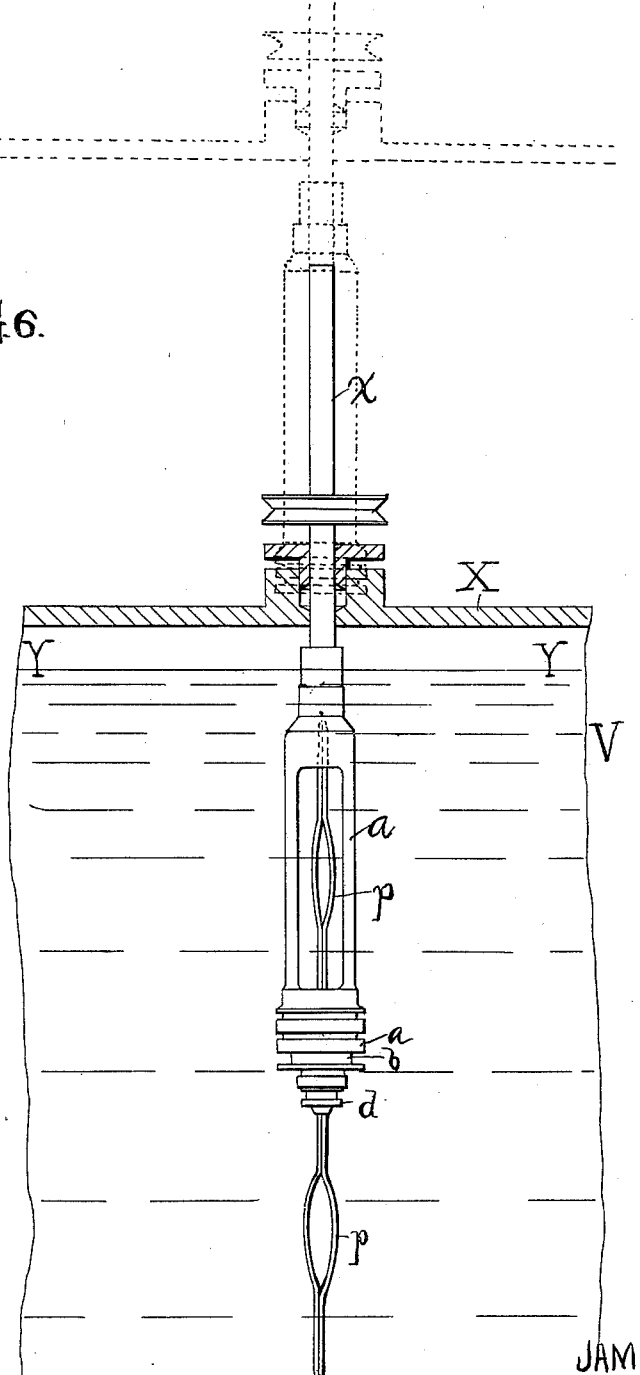

UNITED STATES PATENT OFFICE.

JAMES MAJOR, OF ECCLES, ENGLAND.

APPARATUS FOR DYEING, &c.

SPECIFICATION forming part of Letters Patent No. 667,825, dated February 12, 1901.

Application filed August 14, 1900. Serial No. 26,874. (No model.)

*To all whom it may concern:*

Be it known that I, JAMES MAJOR, a subject of the Queen of Great Britain, residing at Cannon street, Eccles, in the county of Lancaster, England, have invented new and useful Improvements in Apparatus for Dyeing, Bleaching, or otherwise Treating Cops of Spun Yarn, of which the following is a specification.

This invention relates to improvements in or appertaining to the apparatus for which Letters Patent of the United States of America were granted to me, numbered 644,988 and 644,990, both dated March 6, 1900; but said improvements are also equally applicable to other similar apparatus mounted on a cop-carrier fixed at the lower end of a vertically-situated revolving spindle, which is immersed in a tank containing the dye or other liquor with which the cops are to be treated.

The objects of the present invention are to double the production of each machine or apparatus without materially increasing the cost of the same and to enable the cop-carriers to be easily and expeditiously removed from the spindles.

In the accompaning drawings, Figure 1 is a face view of part of my improved apparatus. Fig. 2 is a sectional view of the same. Fig. 3 is a section on line A A, Fig. 2. Figs. 4 and 5 are details showing the spring-clip, and Fig. 6 is a view showing the relation of my improved apparatus to such a vat as is shown in the above-mentioned Patent No. 644,988.

For the purpose of this invention I make the spindles $x$ shorter than are ordinarily required in the machines of the patents referred to, so that their lower ends are not immersed in the dye or other liquid contained in the tank V, and to the lower end of each spindle I affix either a perforated tube or a tubular case with open sides, as $a$. (Shown in Figs. 1 and 2.) The tube or case should have an internal diameter suitable for containing a cop without its touching the inside of the tube and of such a length that the whole of the cop can be carried therein well below the level Y Y of the dye or other liquor, as shown in Fig. 6. The lower end of the aforesaid tube $a$ is enlarged and has a holder $b$ inserted therein, which is retained in its place by a stud $d$, that is secured to a spring-clip $e$, formed to encircle the lower end of the tube $a$, as shown in sectional view, Fig. 3, the inner end of the stud $d$ fitting into a groove $f$. Said holder has tangential or other openings $c$ formed therein, through which the liquor passes, and a vertical hole through the center, in which nipples $g$ and $j$, with cop-carriers, such as $p$, fitted thereto, are inserted, one of said nipples projecting upward and the other downward. The bottom nipple is retained in its place by a stud $l$ and a spring-clip $k$, of like form to the stud and spring-clip hereinbefore described and as shown in Figs. 4 and 5. In order to place the cops and their holder in secured position in the tube $a$, the lid X of the vat may be adapted to be raised, as shown in dotted lines, Fig. 6, carrying the tube $a$ well above the level Y Y of the liquid in the vat V. In this position a cop and holder can readily be placed in the tube $a$ or removed therefrom by employing sufficient force to cause the pin $d$ to slip out of the groove $f$, and after the cop has been removed or replaced the holder $b$ is slipped into the case $a$, when the pin $d$ will again slip into the groove $f$.

I claim as my invention—

1. An apparatus for dyeing or otherwise treating cops of spun yarn, consisting of a spindle, a tube secured at one end to the spindle, a holder and a cop-carrier at each end of the holder, said holder adapted to be secured in the tube and means to revolve the spindle and tube.

2. An apparatus for dyeing or otherwise treating with liquid cops of spun yarn, consisting of a spindle, a tube secured thereto, a holder, cop-carriers at opposite ends of the holder and means for detachably securing the holder in the tube.

3. An apparatus for dyeing or otherwise treating with liquid cops of spun yarn, consisting of a tube, a holder and cop-carriers at opposite ends of the holder and means for detachably securing the holder in the tube.

4. An apparatus for dyeing or otherwise treating with liquid cops of spun yarn consisting of a spindle, a tube, a holder, cop-carriers and a spring-clip to detachably secure said holder in said tube.

5. A holder for cop-carriers having a cylindrical central opening, each end of which is adapted to receive a cop-carrier, said holder having also openings *c* to the central opening from the outside.

6. A holder for cop-carriers having a cylindrical central opening, each end of which is adapted to receive a cop-carrier, said holder having also openings *c* to the center of said cylindrical opening from the outside, and a spring-clip to secure a cop-carrier in the holder, substantially as described.

In testimony whereof I have signed my name to this specification in the presence of two subscribing witnesses.

JAMES MAJOR.

Witnesses:
   JNO. HUGHES,
   J. ERNEST HUGHES.